March 10, 1970     G. HARTLAPP ET AL     3,499,476
SPRAY DRYING OF LIQUIDS TO FORM PARTICULATE SOLIDS
Filed April 23, 1968     2 Sheets-Sheet 1

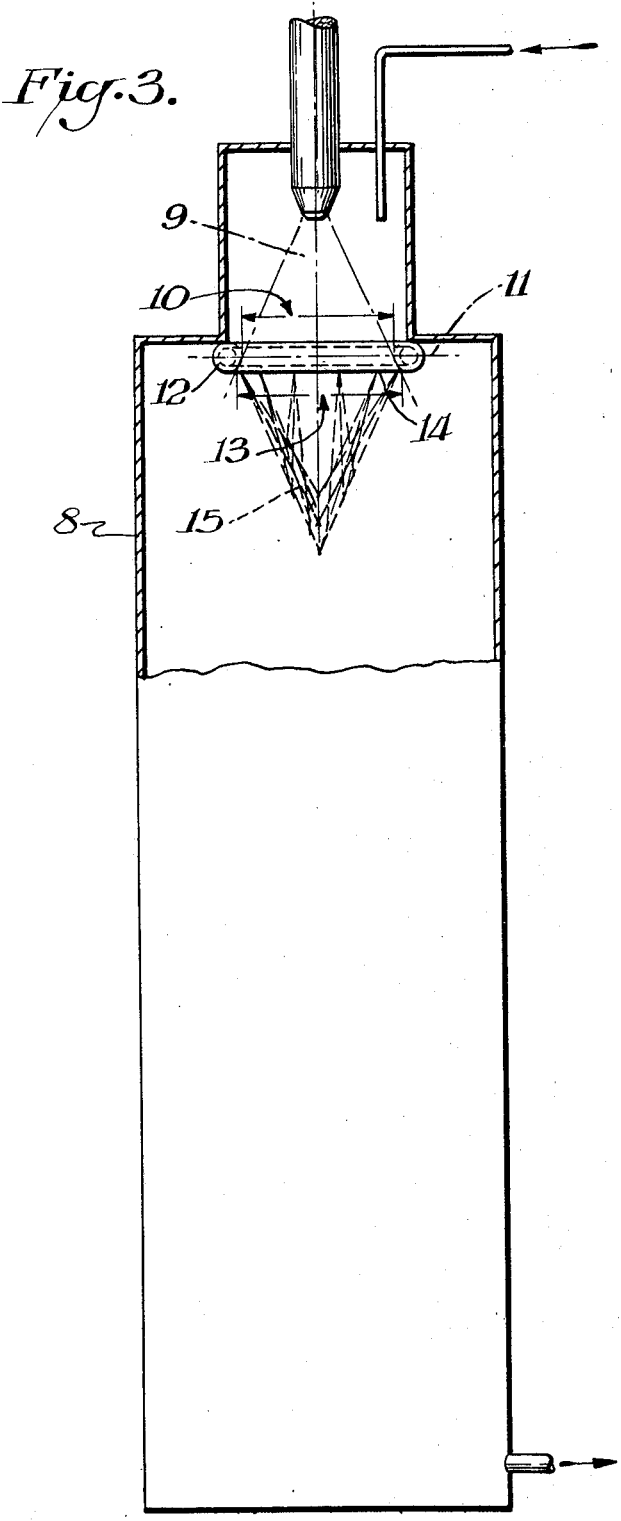

United States Patent Office 3,499,476
Patented Mar. 10, 1970

3,499,476
SPRAY DRYING OF LIQUIDS TO FORM
PARTICULATE SOLIDS
Gerhard Hartlapp, Hermulheim, near Cologne, Helmut Klee, Cologne, and Josef Koch, Knapsack, near Cologne, Germany, assignors to Knapsack Aktiengesellschaft, Knapsack, near Cologne, Germany, a corporation of Germany
Filed Apr. 23, 1968, Ser. No. 723,394
Claims priority, application Germany, Apr. 29, 1967,
K 62,184
Int. Cl. B01d 1/16
U.S. Cl. 159—4                    10 Claims

ABSTRACT OF THE DISCLOSURE

Production of particulate solids from starting material comprising solutions or suspensions, by nozzle-spraying the starting material in a tower through a flame zone produced by means of a set of burners arranged in annular fashion, the nozzle being formed with three mutually inclined annular chambers which are arranged concentrically with respect to each other and comprise an inner annular nozzle chamber, an intermediate annular nozzle chamber and an outer annular nozzle chamber, whose outlet openings form concentric annular nozzle slits, and the starting material being sprayed through the said intermediate nozzle chamber in association with a spray inducing medium issuing through the said inner and outer nozzle chambers, which process comprises effecting the spraying of the starting material through the said intermediate annular nozzle slit and of the spray inducing medium through the said inner annular nozzle slit in a spray direction extended outwardly with respect to the nozzle centre axis and inclined to impinge upon the effluent from the intermediate annular nozzle and effecting the spraying of the spray inducing medium through the said outer nozzle slit in a spray direction inclined inwardly to impinge upon the jet of sprayed material issuing through the said intermediate annular nozzle slit.

---

Figure 1:
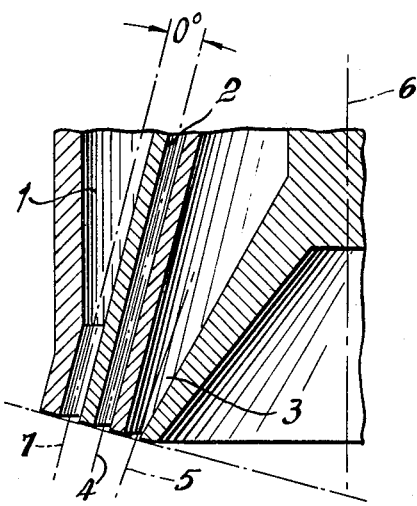

The present invention relates to a process and an apparatus for the manufacture of particulate solids from starting material comprising solutions or suspensions, and relates more particularly to the manufacture of alkalimetal tripolyphosphates from starting material comprising alkalimetal phosphate solutions or suspensions, by subjecting the starting materials to spray-drying.

Spray-drying processes which may entail chemical reactions are usually carried out with the use of nozzles which are formed with three annular chambers arranged concentrically with respect to each other, whose outlet openings are arranged to form concentric annular slits.

In spray-drying processes which are carried out with the object of chemically modifying the sprayed substance and which include, for example, the condensation of alkali-metal orthophosphates to alkali-metal polyphosphates, the starting substance must be sprayed in the form of droplets of limited size. The droplets produce the desired final product which is obtained in powder form or in the form of hollow balls of a particular particle-size distribution. Spray-drying processes such as those referred to hereinabove and spray towers for use therein have been described, for example, in German Patents Nos. 1,097,421 and 1,018,394. U.S. Patents 2,898,189 and 3,023,083 respectively correspond thereto.

The size of the droplets and the particle-size distribution in the final powder are factors which are often critical for certain of the products' properties and these in turn may be found decisively to influence the contemplated use.

Sometimes the particle-size distribution in the final powder is also found to be critical for the smooth running of the spray process. The throughput in the spray tower, the transport of material and the working costs are affected considerably by the particle-size distribution. For example, the removal of water will be incomplete if particles which are too coarse are obtained in the spray tower. The powder then tends to cake, and forms crusts and lumps. These in turn make the continuous removal of material from the spray tower impossible with the result that a standstill of the spray process is unavoidable.

For reasons of economy, however, experiments have been made with the object of increasing the throughput capacity of spray towers as far as possible. However, where the efficiency of a spray nozzle which is working well is increased beyond a certain critical value, it is found that the spray efficiency decreases with the resultant formation of larger droplets. This either entails the operational difficulties referred to herein above or necessitates an enlargement of the spray tower so as to provide more free space to enable the larger droplets to dry. For this reason, it has been held in the art that increasing the spray tower efficiency also means increasing its volume.

It has now unexpectedly been found that for an unchanged volume spray towers of conventional design can be made to admit of a practically unlimited throughput of material given that the necessary flame temperature in the tower is produced and maintained by the supply of sufficient quantities of fuel gas and fresh air and given further that the starting material can be sprayed to form droplets which have the desired size.

Single-material nozzles spraying solutions under high pressure are not very suitable in those cases in which high efficiency combined with fine spraying are the requirements to be met. For example, it is not possible to use single-material nozzles for the spraying through a single nozzle of 5 cubic metres of solution per hour to obtain particles of which 95% have a diameter of less than 0.1 mm. The reason for this is that it would be necessary to spray the solution under a pressure higher than 200 atmospheres gauge. Two-material nozzles are used for the spraying of such large volumes of solution. These are operated with compressed air or steam as the spraying agent and they have a capacity of 5 to 7 cubic metres per hour of the solution in the extreme case.

Needless to say, it is very desirable to improve the nozzle efficiency and yet to obtain the same particle fineness. However, this has not been possible heretofore.

Attempts have already been made by the selection of a minimum value for the width of the spraying slit to increase the spraying pressure for the solution and thereby to improve the spraying efficiency of the nozzle. It has been found, however, that the use of pressures increased by no more than 0.5 atmosphere gauge entails the formation of droplets so large that normal operation is rendered impossible by the material which then cakes together in the tower. These experiments were carried out using steam or air at a pressure of 6 atmospheres gauge, these spray media being normally available in industry.

It has now unexpectedly been found that the productivity of conventional spray processes can be improved by the combination of the steps comprising increasing the spraying pressure for forcing the feed solution or suspension through the feed spraying nozzle, increasing the pressure of the spray inducing medium, and regulating the spreading out of the spray cone by the appropriate arrangement of the nozzle outlet openings.

For example, in the case of a nozzle with a capacity 7 cubic metres per hour for a feed-material pressure of 0.3 atmosphere gauge and for a spray-inducing medium pressure of 6 atmospheres gauge, it is possible to increase the nozzle's capacity to 10 to 20 cubic metres per hour at pressures of 1 to 10 atmospheres gauge for the feed material and of 10 to 30 atmospheres gauge for the spray inducing medium.

Processes which relate to the production of particulate solids from solutions or suspensions, and more particularly to the production of alkali-metal tripolyphosphates from alkali-metal phospate solutions or suspensions, are already known as mentioned above. These processes comprise nozzle-spraying the feed materials in a tower through a flame zone produced by means of a set of burners arranged in annular fashion, the nozzle comprising three annular chambers which are arranged concentrically with respect to each other and whose outlet openings form concentric annular slits. The solution or suspension to be sprayed is delivered through the central annular space whilst the spray inducing medium is delivered through the inner and outer annular spaces. As compared therewith, the process of the present invention comprises nozzle-spraying the feed materials through the central and inner annular slits in a spray direction extended outwardly with respect to the centre axis of the nozzle, and through the outer annular slit in a spray direction inclined to impinge upon the feed spray jet issuing through the intermediate annular slit. By varying the pressure prevailing in the outer annular space, and by positioning the outer annuluar slit in such a manner that the lines of action of the outer and the intermediate annular slits include an angle between 10 and 110°, preferably between 20 and 90°, it is possible so to regulate the spray cone issuing from the nozzle that it has a diameter smaller than that of the burner ring, in the subjacent plane of the burner ring.

In carrying out the process of the present invention, it is advantageous to maintain the spray inducing medium in the inner and outer annular chambers under a pressure at least as high as that exerted on the solution or suspension to be sprayed, the pressure on the spray inducing medium in the outer annular chamber being preferably made as high as, and the pressure on the spray inducing medium in the inner annular chamber being preferably made at least twice as high as, that on the solution or suspension in the intermediate annular nozzle chamber. The spray medium is preferably steam and/or compressed air.

For example, the following relations have been found to exist between the pressures prevailing in the individual annular chambers:

| Pressure on solution in the intermediate annular chamber (atm. gauge) | Pressure on spray inducing medium in the inner annular chamber (atm. gauge) | Pressure on spray inducing medium in the outer annular chamber (atm. gauge) |
|---|---|---|
| 2.0 | 4 | 3 |
| 2.5 | 7 | 4 |
| 3.0 | 13 | 5 |
| 3.5 | 17 | 6 |

Figure 2:
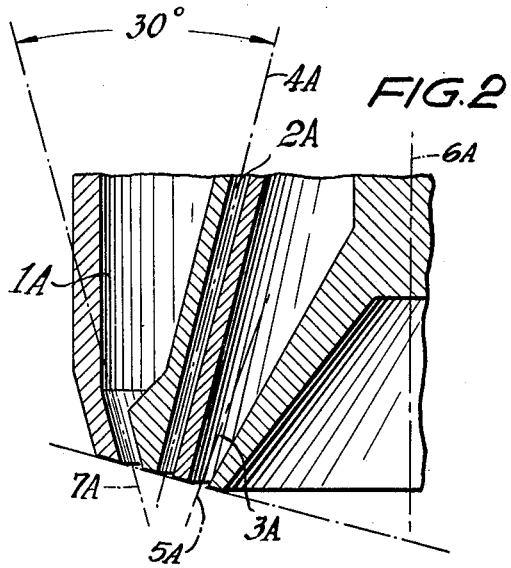

The process of the present invention is preferably carried out using the apparatus shown diagrammatically, and by way of example, in FIGURE 2 of the accompanying drawing. The apparatus is a nozzle formed with three annular chambers (1A, 2A and 3A), these being an outer, an intermediate and an inner annular chamber, which are arranged concentrically and mutually inclined with respect to each other and of which the outlet openings are designed to form concentric annular slits. The lines of action 4 and 5 of the intermediate and inner annular chambers or slits are directed outwardly with respect to the centre axis 6 of the nozzle, whereas the lines of action 7 at least of the outlet end of the outer annular chamber or slit 1 forms with the lines of action 4 of the intermediate annular chamber or slit 2 an angle of 10 to 110°, preferably 20 to 90°. The intermediate annular chamber or slit 2 should preferably have an inside width of about 0.7 to 0.9 mm., and the inner and outer annular chambers or slits should have an inside width of about 2 mm.

The present process has been found to be particularly useful for the production of alkali-metal tripolyphosphates and alkali-metal pyrophosphates from alkali-metal orthophosphate solutions or suspensions.

In this case, the orthophosphate solutions with their selected ratio of alkali-metal oxide to $P_2O_5$ must be submitted to spraying of such intensity that the resulting droplets substantially have a diameter not exceeding 0.2 mm. More particularly, it is desirable to produce the sprayed material in the form of droplets which substantially have a diameter of 0.05 to 0.15 mm. This can readily be determined by microscopic examination. The first particles coalesce to some extent to form small agglomerates comprising 2 to 10 of the individual particles. Thus the sieve analysis may be found to simulate a coarser particle size inconsistent with that determined by microscopic examination.

The orthophosphate must be so finely sprayed in order substantially to transform it into a condensed phosphate during the rapid passage through the flame zone. The particle size of 0.2 mm. in diameter has been found to be critical for the production of high-percentage tripolyphosphate in a spray tower, except in those cases in which the particle size is intentionally increased by the incorporation of specific additives so as to produce tripolyphosphate with an apparent density of less than 0.500 gram per cubic centimetre. Tripolyphosphate which is obtained substantially in the form of particles with a diameter larger than 0.2 mm. has been found to combine a substantially reduced dissolving power for lime with a substantially impaired quality.

The spray nozzle is used for spraying the solution through an annular flame zone whose diameter must be kept small in order to produce a satisfactory concentration of heat. This is necessary to ensure the complete drying of the solution and the condensation of the orthophosphate to tripolyphosphate during the rapid passage through the flame zone.

As mentioned above, it is necessary to produce a spray cone which at the level of the burners is smaller than the burner ring. However, it should be just large enough to permit the complete combustion of the gases issuing from the burners. As soon as the outer periphery of the spray cone is found to approach the flame core so closely that the fuel gas becomes quenched and ceases to undergo complete combustion in the flame, this being readily determinable by the higher $CO_2$ content in the issuing gas and by an increased gas consumption rate, it is necessary to reduce the spray cone or the spacing between the nozzle and the level of the burner. The spray cone can be easily enlarged or reduced by modification of the outer nozzle slit and of the pressure prevailing in the outer nozzle space.

In the accompanying drawing, FIGURE 1 represents a cross-sectional view of the lower half of a conventional spray nozzle and FIGURE 2 is a corresponding cross-sectional view of the nozzle of the present invention. FIGURE 3 is a diagrammatical view in elevation of the nozzle of FIGURES 1 and 2 in conjunction with a spray tower and burner. In the three figures, the reference numerals 1, 2 and 3 represent the outer nozzle chamber, the central nozzle chamber and the inner nozzle chamber, respectively, with suffix A used in FIGURE 2.

The following examples further illustrate the invention.

Example 1.—(conventional process)

A spray tower 8 (FIG. 3) about 15 metres high and about 6 metres in diameter of the type usually employed for the production of sodium tripolyphosphate was used. The spray nozzle shown in FIGURE 1 was fed with air as the spray inducing medium. In the inner and outer nozzle chambers, the air was maintained at a pressure of 6 atmospheres gauge; this corresponded to a supply of 1200 cubic metres of air per hour. A sodium orthophosphate solution with a $Na_2O:P_2O_5$ ratio of 5:3 was sprayed to issue through the intermediate slit under a pressure of 0.3 atmosphere gauge. The solution was used at the rate of 6.5 cubic metres per hour (=10 tons of solution per hour) and produced 5.2 tons of sodium tripolyphosphate per hour. The sodium tripolyphosphate particles or hollow balls were examined under the microscope. Most of them were found to have a diameter between 0.05 and 0.2 mm. The apparent density was 0.6 to 0.7 kg./litre.

The operation of the spray tower was satisfactory at a pressure reduction of 30 mm. of water at the tower outlet, given sufficient supply of gas. The product obtained had a purity of 98% by weight.

Example 2.—(comparative example)

A second experiment was carried out under the conditions set forth in Example 1 save that the orthophosphate solution was maintained under a pressure increased to 0.6 atmosphere gauge. The spraying efficiency was found to increase to 7.5 cubic metres per hour. After a short while, lumpy material agglomerated in the tower and operation of the tower was disturbed. Under the microscope the diameter of most of the individual particles was found to have increased to about 0.5 mm. The $Na_5P_3O_{10}$ content was determined to be 88% by weight. The dissolving power for lime was also found to have been reduced by 20%. The apparent density was 0.6 kg./litre.

The product had a quality much poorer than that of the product obtained in Example 1.

Example 3.—(process of invention)

The example was carried out in the spray tower described in Example 1. Steam was used as the spray inducing medium in a nozzle as shown in FIGURE 2. The lines of action 4A and 7A of intermediate and outer annular nozzle chambers 2A and 1A are mutually inclined at an angle of 30°. The steam was maintained under a pressure of 12 atmospheres gauge (corresponding to 1300 kg./hour) in the inner nozzle chamber, and under a pressure of 5 atmospheres gauge (corresponding to 1500 kg./hour) in the outer nozzle chamber. A solution of sodium orthophosphate with a $Na_2O:P_2O_5$ ratio of 5:3 was sprayed at a rate of 12 cubic metres per hour (corresponding to 18 tons per hour) under a pressure of about 3.5 atmospheres gauge through the intermediate nozzle slit, which was about 0.7 to 0.9 mm. wide. As shown in FIGURE 3, the resultant spray cone 9 has a diameter 10 in the subadjacent plane 11 of burner 12 which is smaller than the diameter 13 of burner set 14 which produces flame zone 15. 8.3 tons per hour of sodium tripolyphosphate in the form of particles having a diameter between 0.065 and 0.15 mm. were obtained. Most of the individual particles or hollow balls had a diameter of 0.12 mm. The apparent density was 0.72 kg./litre. The $Na_5P_3O_{10}$ content was found to be 98% by weight.

The operation of the spray tower was satisfactory at a pressure reduction of 30 mm. of water at the tower outlet, given sufficient supply of gas.

Example 4

An orthophosphate solution with a $Na_2O:P_2O_5$ ratio of 2:1 was sprayed under the conditions described in Example 3. 15 cubic metres of solution per hour, the solution having a density of 1.45 kg./litre and a $P_2O_5$ content of 24% by weight, gave 10 tons per hour of sodium pyrophosphate. The $Na_4P_2O_7$ was obtained in the form of particles having a diameter between 0.05 and 0.1 mm. The final product had a $Na_4P_2O_7$ content of 99% by weight.

The operation of the spray tower was satisfactory at a pressure reduction of 30 mm. of water at the tower outlet, given sufficient supply of gas.

What is claimed is:

1. In the process for the manufacture of particulate solids from starting material comprising solutions or suspensions, by nozzle-spraying the said starting material in a tower through a flame zone produced by means of a set of burners arranged in annular fashion, the nozzle being formed with three annular chambers which are arranged concentrically and mutually inclined with respect to each other and comprise an inner annular nozzle chamber, an intermediate annular nozzle chamber and an outer annular nozzle chamber, whose outlet openings form concentric annular nozzle slits directed downwardly toward said set of burners, and the starting material being sprayed through the said intermediate nozzle chamber in association with a spray inducing medium issuing through the said inner and outer nozzle chambers, the improvements which comprises effecting the spraying of the starting material through the said intermediate annular nozzle slit and of the spray inducing medium through the said inner annular nozzle slit in an annular spray direction inclined to diverge outwardly with respect to the nozzle centre axis, effecting the discharge of the spray inducing medium through the said outer nozzle slit in a spray direction inclined to converge inwardly with respect to and to impinge upon a jet of sprayed material issuing through the said intermediate annular nozzle slit, and producing a resultant spray cone which, in a subjacent burner plane, has a diameter smaller than that of the burner set by means of pressure variation in the said outer annular nozzle chamber and by means of the said outer annular nozzle slit, the latter being so arranged that the lines of action of the said outer and intermediate annular nozzle slit include an angle between 10 and 110°.

2. The process of claim 1, wherein the lines of action of the said outer and intermediate annular nozzle slits include an angle between 20 and 90°.

3. The process of claim 1, wherein the spray inducing medium is steam or air.

4. The process of claim 1, wherein alkali metal tripolyphosphates and alkali metal pyrophosphates are produced from starting material comprising alkali metal phosphate solutions or suspensions.

5. The process of claim 1, wherein the pressure of the spraying inducing medium in the inner and outer annular nozzle chambers is at least as high as that of the starting material being sprayed.

6. The process of claim 5, wherein the pressure of the spray inducing medium in the outer annular nozzle chamber is at least as high as, and the pressure of the spray inducing medium in the inner annular nozzle chamber is at least twice as high as, the pressure of the starting material being sprayed through the intermediate annular nozzle chamber.

7. An apparatus for the manufacture of particulate solids from starting material comprising solutions or suspensions, by nozzle-spraying the said starting material in a tower through a flame zone produced by means of a set of burners arranged in annular fashion, the said apparatus being a nozzle formed with three annular chambers which are arranged concentrically with respect to each other and comprise an inner annular nozzle chamber, an intermediate annular nozzle chamber and an outer annular nozzle chamber whose outlet openings form annular nozzle slits, wherein the lines of action of the intermediate and inner annular nozzle chambers or slits are directed outwardly with respect to the nozzle centre axis and wherein the lines of action at least of the outlet end of the outer annular nozzle chamber of slit forms with the lines of action of the intermediate annular nozzle chamber or slit an angle between 10 and 110°.

8. The apparatus of claim 7, wherein the lines of action at least of the outlet end of the outer annular nozzle chamber or slit forms with the lines of action of the intermediate annular nozzle chamber or slit an angle between 20 and 90°.

9. The apparatus of claim 7, wherein the intermediate annular nozzle slit has an internal width between about 0.7 and 0.9 mm.

10. The apparatus of claim 7, wherein the inner and outer annular nozzle slits have an internal width of about 2 mm.

References Cited

UNITED STATES PATENTS

| | | | |
|---|---|---|---|
| 1,358,084 | 11/1920 | Leigh | 252—305 |
| 2,006,757 | 7/1935 | Bostrom et al. | 159—4 X |
| 2,879,862 | 3/1959 | Burden | 23—277 X |
| 3,212,559 | 10/1965 | Williamson | 159—4 |
| 3,112,239 | 11/1963 | Andermatt | 159—4 |
| 3,247,890 | 4/1966 | Williams | 159—4 X |
| 3,322,181 | 5/1967 | Williams | 159—4 |

FOREIGN PATENTS 755,950  8/1956  Great Britain.

NORMAN YUDKOFF, Primary Examiner

J. SOFER, Assistant Examiner

U.S. Cl. X.R.

159—48; 239—422